June 23, 1931.  H. C. SADLER  1,811,156
WELDING HANDLE
Filed Feb. 19, 1929  2 Sheets-Sheet 1
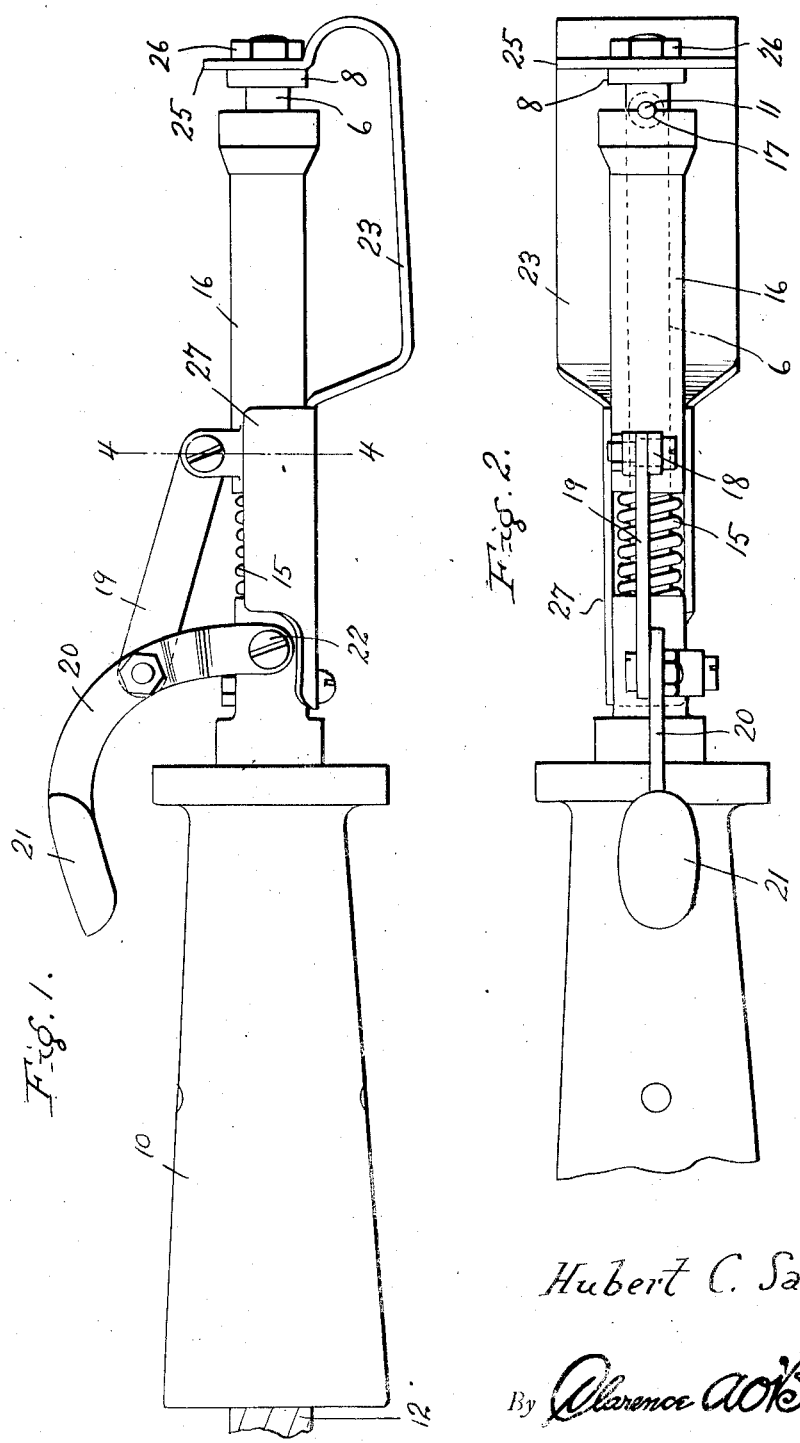
Inventor
Hubert C. Sadler
By Clarence A. O'Brien
Attorney

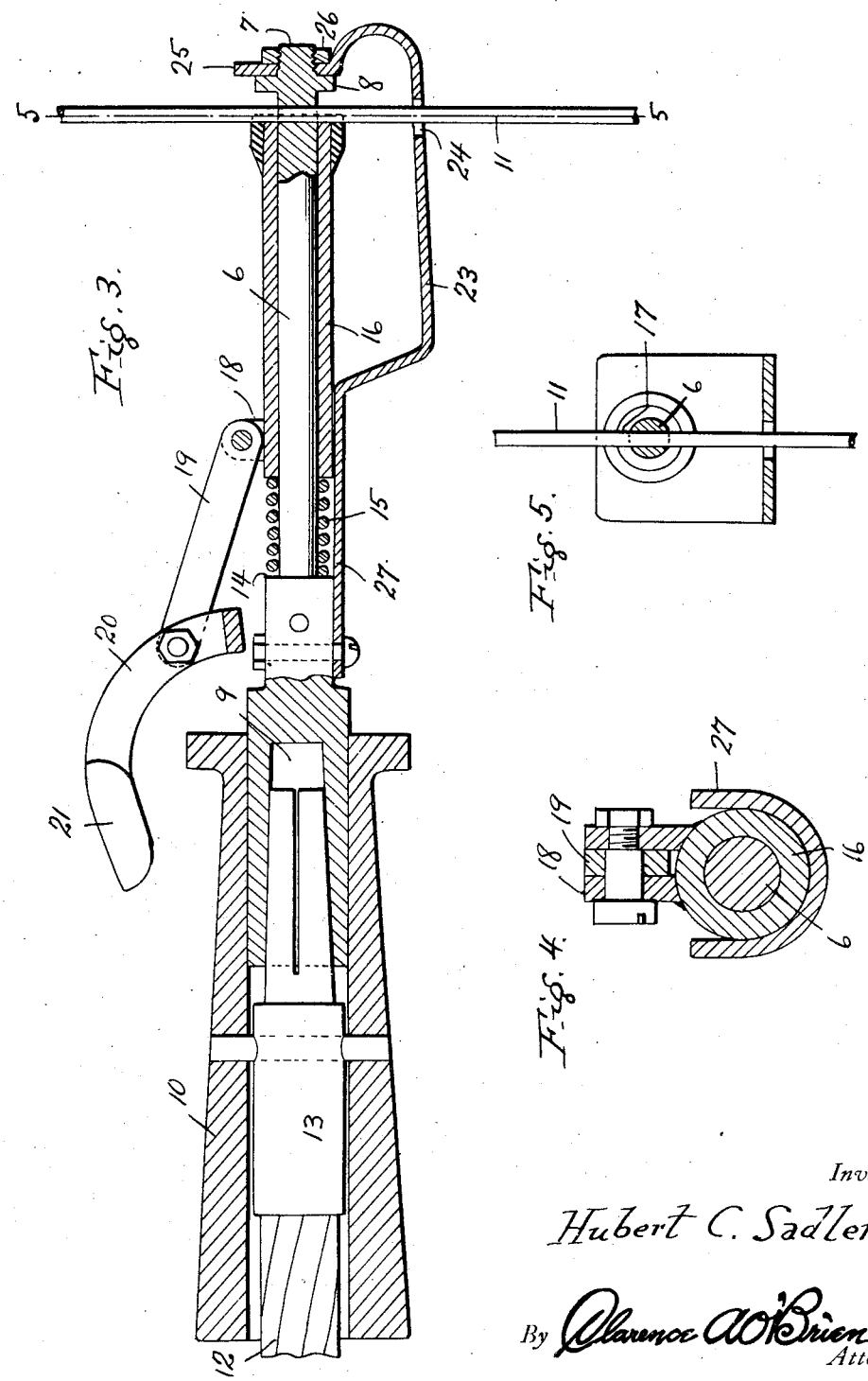

Patented June 23, 1931

1,811,156

UNITED STATES PATENT OFFICE

HUBERT C. SADLER, OF HAMILTON, OHIO

WELDING HANDLE

Application filed February 19, 1929. Serial No. 341,194.

This invention relates to an improved arc welding handle especially designed to overcome certain objectionable defects in tools of this particular species.

Broadly stated, the invention comprises an insulated hand grip, a shank carried by the hand grip and having means for connection of the current supply, said shank being constructed to permit slidable mounting of the welding rod thereon to permit the welding rod to be dropped in a step by step or intermittent manner as it is gradually used. A novel retaining means is associated with the shank to normally couple the rod to the shank but to allow it to drop as it is consumed. In addition, a safety shield is employed.

A particular feature of construction to be emphasized is the utilization of a hollow hand grip into which one end of the shank extends, this end being formed with a socket for reception of the terminal on the electric conducting terminal.

Another feature of construction is the provision of a guide hole formed vertically through the outer end portion of the shank and adapted for slidable reception of the electric welding rod, the arrangement being such that the rod is allowed to drop down by gravity in a step by step or intermittent fashion.

An equally important distinction is the retaining device which embodies the slidable sleeve cooperable with the guide opening and adapted to bear against the rod to hold the rod in position under normal working conditions, but to allow it to be set down in a step by step manner, as it is consumed, there being novel manually tripped releasing means cooperable with this sleeve.

In addition there is a spring means for pressing the sleeve against the rod and a shield which includes the portion embracing the spring to protect the spring coils and a portion operating as an antisplash guard.

One of the outstanding advantages of the construction is speed and facility of manipulation. In the modern plant of today speed is one of the outstanding requirements. Equipment is subject to great abuse due to production speed. Any arc welding handle which has adjustments to be made to lengthen the welding rod or to renew a rod will not do as this takes up valuable time, and this is one of the distinctions of the present handle, for it does not require such time and painstaking adjustment.

An equally important advantage is safety in use. Ordinarily as soon as a welding handle is used a few hours the splash from the wells throws a spray of iron and dirt all over the welding handle. The iron welds onto the iron of the handle and builds up deposits which gets between the grips of the handle and rod. The handle clamps again on the rod and does not make a good contact to these deposits and accumulations and an arc is started at the point where the handle holds the rod. This makes the welds poor at the welding end of the rod and frequently sets the operator's clothes and gloves on fire, due to the excessive heating of the handle as occasioned when an arc is started at the point where the handle holds the rod. In fact the arc welding handle gets so hot that the operator can not adjust his handle without burning his hands. After an arc is once started in a handle its life is a matter of hours, for as soon as the temper is gone out of the spring the rod wobbles around in the slot and soon burns up. Then too the splash of iron from an arc will fly upward and burns holes through electric light bulbs in the welding booths and through glass on the operator's safety face mask. This is a very expensive drawback as lights and glass cost money and require much time to replace.

It will be seen then that I have evolved and produced an especially designed safety for arc welding handles which is characteristically new and a novel contribution to the art.

Other features and advantages will become more readily apparent from the following description and drawings.

In the drawings:

Figure 1 is a side elevational view of an arc welding handle constructed in accordance with the present invention.

Figure 2 is a top plan view thereof.

Figure 3 is a longitudinal sectional view showing the intimate association of parts more clearly.

Figure 4 is a transverse sectional view on the line 4—4 of Figure 1.

Figure 5 is a similar vertical sectional view taken approximately upon the plane of the line 5—5 of Figure 3.

A clear conception of the entire tool may be seen in Figure 3. Here the shank which is cylindrical and solid is designated by the reference character 6 and has a threaded extremity 7 extending beyond a stop flange 8. These details serve in a manner to be hereinafter described. The opposite end of the handle is formed with an enlargement providing a socket 9 and this is fitted telescopically into the bore of the hand grip 10. The hand grip is of suitable insulation material, for instance it may be of wood, though a less inflammable material is desirable. Just inward of the flange 8 is a vertical hole through which the welding rod 11 passes. This hole is arranged vertically and the rod is adapted to slide down through it in a sort of a step by step manner.

The current supply cable 12 extends into the hand grip and is provided with a terminal 13 fitting into the socket and providing an electrical connection with the shank. Incidentally the shank is of electricity conducting material and carries the current through the welding rod 11.

The formation of the socket on one end of the shank provides a stop shoulder as at 14 and a coiled spring 15 surrounding the shank bears against this at one end. The opposite end of the spring bears against the slidable retaining sleeve 16. The sleeve is mounted on the shank and has its notched end cooperable with the vertical rod guide hole for the rod 11. In fact, the rod seats in these diametrically opposite notches in the end of the sleeve. The notches can be seen in Figure 5, being represented by the reference characters 17. Upstanding ears or lugs 18 on the opposite end of the sleeve are provided and a link 19 is pivotally connected thereto at one end. The opposite end of the link is connected to an arcuate operating lever 20, having a finger piece 21. This lever is pivoted as at 22 from one side of the shank as shown in Figure 1.

Pressing down on the finger piece 21 actuates the lever in such a manner as exerts an endwise pull on the links 19 and this slides the sleeve 16 against the action of the spring and momentarily releases the rod 11. The rod under action of gravity will drop down so long as the sleeve is disengaged therefrom. The moment however that the operator releases the lever the spring actuates the sleeve back and grips the rod and holds the rod in the hole. Thus as the rod is successively consumed it is replaced by this intimate dropping action.

To add to the safety and to prolong the life of the tool I provide a guard preferably composed of copper, and this includes a substantially U-shaped portion 23 having an opening 24 for slidable passage of the rod 11 and having an upstanding end portion 25 confined between the flange 8 and a retaining nut 26 on the threaded end of the shank. There is a channel shaped extension at 27 which embraces the sleeve, the spring and shank and serves as a protector for the spring and prevents splashing metal from accumulating here and ruining the spring.

Particularly do I wish to emphasize the fact that the welding handle has a copper shield which throws the greater part of the splash downward or off to one side and very little if any of the iron and dirt gets to the operator's safety mask. Hence a clear vision is assumed at all times. Dirt and iron deposits will not weld to a copper shield and they can be scraped off with a pocket knife at the end of the day's run. The copper shield does not let this deposit get into the working parts of the spring. The contact is always tight and no arc is formed in the handle to heat it up.

Under normal operating conditions a single hand may be employed to manipulate the device. Whenever a portion of the welding rod has been consumed and is desired to replace it, simply press down on the lever 20, withdraw the sleeve, and allow the rod to drop a slight distance, then release the lever and allow the sleeve to come back to engage the rod to hold the rod. This is simple and expedites the welding work. It is thought however, that persons skilled in the art to which the invention relates will obtain a clear understanding of the construction, features and advantages after reading the description in conjunction with the drawings. Therefore, a more lengthy description is regarded unnecessary.

Minor changes, in size, shape, materials and rearrangement of parts coming within the field of the invention claimed may be resorted to in actual practice if desired.

Having thus described the invention, what I claim as new and desire to secure by Letters Patent is:—

1. In a welding handle of the class described, a shank having a hole at its outer end extending in a direction transverse to the length of the shank and through which a welding rod is adapted to slide, a sleeve slidable on said handle and including a portion engageable with the rod, spring means for urging the sleeve into rod gripping position, manually manipulated releasing means for the sleeve, said means comprising a pivoted lever and an operating link between the lever and the sleeve.

2. A welding handle comprising a shank having a hand grip and current supply means at one end and having a guide hole at its opposite end extending in a direction transverse to the length of the shank, for slidable reception of a welding rod, a slidable retaining sleeve on said shank, a spring interposed between the sleeve and a shoulder on said shank and surrounding the shank, a pivoted operating lever on the shank, a link connection between the sleeve and lever, an anti-splash guard having a portion embracing the sleeve and spring and having a portion secured to said shank forwardly of the rod guide hole.

3. In a welding handle of the class described, a shank having a socket at one end, a hand grip telescopically receiving said socket, a current conducting cable including a terminal fitted into said socket, a sleeve slidable on said shank, said shank at its forward free end having a vertical hole extending therethrough and through which a welding rod is adapted to slide, said sleeve at its forward free end being notched at the top and bottom thereof for gripping engagement with the welding rod, spring means convoluted about said shank and having one end thereof impinging against the rear end of said sleeve, for normally urging said sleeve into gripping engagement with the welding rod, an operating lever pivotally mounted on said shank forwardly of said socket, a link pivoted at one end to the rear end of said sleeve, and at its other end to an intermediate portion of said operating lever, whereby said sleeve may be moved against the action of said spring out of gripping engagement with the welding rod, a splash shield comprising a substantially U-shaped portion, means for securing one leg of the U-shaped portion of said shield to said shank forwardly of the vertical guide hole, the other leg of said U-shaped portion merging into an elongated channel shaped portion, disposed at an angle to said last mentioned leg, means for securing the free end of said channel portion to said shank adjacent said socket for slidably accommodating the rear end portion of said sleeve, and said spring arranged in said channel portion.

In testimony whereof I affix my signature.

HUBERT C. SADLER.